US006836549B1

(12) United States Patent
Quan et al.

(10) Patent No.: US 6,836,549 B1
(45) Date of Patent: Dec. 28, 2004

(54) METHOD AND APPARATUS FOR SYNTHESIZING AND REDUCING THE EFFECTS OF VIDEO COPY PROTECTION SIGNALS

(75) Inventors: Ronald Quan, Cupertino, CA (US); Gerow D. Brill, Danbury, CT (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/388,296

(22) Filed: Sep. 1, 1999

Related U.S. Application Data
(60) Provisional application No. 60/098,804, filed on Sep. 2, 1998.

(51) Int. Cl.$^7$ ............................................... H04N 7/167
(52) U.S. Cl. ..................... 380/221; 380/201; 380/203; 380/204; 380/205; 380/210; 380/224; 713/200
(58) Field of Search ................. 380/201, 203–205, 380/210, 224, 22; 713/200

(56) References Cited

U.S. PATENT DOCUMENTS

| | | | | |
|---|---|---|---|---|
| 4,695,901 A | * | 9/1987 | Ryan | 380/204 |
| 4,697,211 A | * | 9/1987 | Balaban et al. | 348/532 |
| 4,698,679 A | * | 10/1987 | Balaban et al. | 348/532 |
| 4,933,774 A | * | 6/1990 | Ishimaru | 358/335 |
| 5,157,510 A | | 10/1992 | Quan | |
| 5,305,109 A | * | 4/1994 | Harford | 348/737 |
| 5,402,488 A | * | 3/1995 | Karlock | 380/5 |
| 5,410,364 A | * | 4/1995 | Karlock | 348/683 |
| 5,661,801 A | * | 8/1997 | Sperber | 380/204 |
| 5,815,630 A | * | 9/1998 | Sato | 386/44 |
| 5,864,591 A | * | 1/1999 | Holcombe | 375/345 |
| 5,907,655 A | * | 5/1999 | Oguro | 386/94 |

(List continued on next page.)

FOREIGN PATENT DOCUMENTS

| | | | | |
|---|---|---|---|---|
| WO | WO9715142 A1 | * | 4/1997 | H04N/5/782 |
| WO | WO9716022 A1 | * | 5/1997 | H04N/7/167 |
| WO | WO0013413 A1 | * | 3/2000 | H04N/5/913 |

OTHER PUBLICATIONS

Takiff, Johnathan, Macrovision Hopes it has out–pirated video–tape pirates, 1988, Chicago Tribune, p. 83.*
Qiao et al, Watermarking Methods for MPEG Encoded Video: Towards Resolving Rightful Ownership, 1998, IEEE, pp. 276–285.*
Barr, David, Copy Protection for High–Definition Baseband Video, 2000, IEEE, pp. 174–177.*
Brendan et al, Technical Challenges of Protecting Digital Entertainment Content, 2003, IEEE, pp. 72–78.*

*Primary Examiner*—Ayaz Sheikh
*Assistant Examiner*—Aravind Moorthy
(74) *Attorney, Agent, or Firm*—George Almeida

(57) ABSTRACT

A method and apparatus for defeating copy protection signals in a video signal, and also for providing copy protection signals for a video signal, is disclosed. The defeat technique generally utilizes a particular pulse position shifting, modulation, etc., of AGC, normal sync and/or pseudo sync pulses to increase the separation between the pulses. Various embodiments are disclosed including selective shifting of the relative positions of either the sync/pseudo sync or AGC pulses, trimming portions of the sync/pseudo sync and/or the AGC pulses and narrowing of either the sync/pseudo sync and/or the AGC pulses, all to provide the selective position separation between the sync/pseudo sync and AGC pulses. The copy protection technique includes various embodiments for dynamically varying the sync/pseudo sync and AGC pulse separation by applying a modulation of the above position shifting, trimming and/or narrowing techniques over selected time periods to cycle from the copy protection condition to the copy protection defeat condition, back to the copy protection condition.

55 Claims, 13 Drawing Sheets

U.S. PATENT DOCUMENTS

| | | | | |
|---|---|---|---|---|
| 5,953,417 | A | * | 9/1999 | Quan .......................... 380/203 |
| 6,041,158 | A | * | 3/2000 | Sato ............................. 386/1 |
| 6,058,191 | A | * | 5/2000 | Quan .......................... 380/203 |
| 6,173,109 | B1 | * | 1/2001 | Quan ............................ 386/1 |
| 6,188,832 | B1 | * | 2/2001 | Ryan ........................... 386/94 |
| 6,191,725 | B1 | * | 2/2001 | Lavoie ......................... 342/92 |
| 6,295,360 | B1 | * | 9/2001 | Ryan et al. .................... 380/54 |
| 6,404,889 | B1 | * | 6/2002 | Ryan et al. .................. 380/201 |
| 6,459,795 | B1 | * | 10/2002 | Quan .......................... 380/221 |

* cited by examiner

FIG. 5a COPY PROTECTED VIDEO (PRIOR ART) 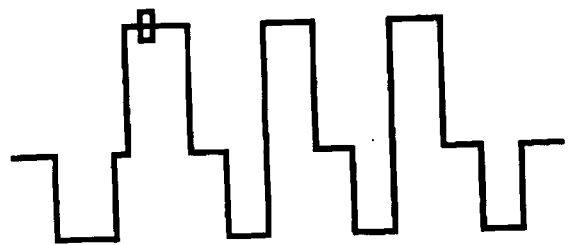
FIG. 5b DELAY LINE 50 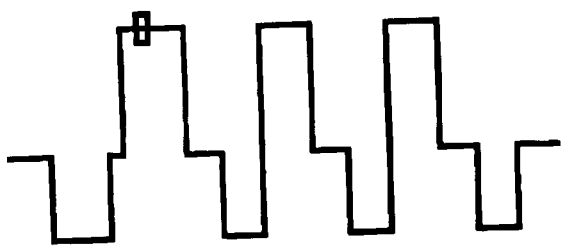
FIG. 5c BLACK LEVEL CLIPPER 56 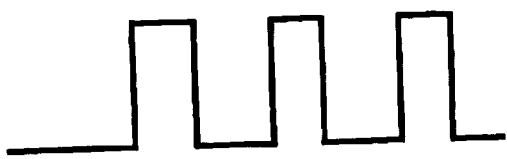
FIG. 5d AGCLL 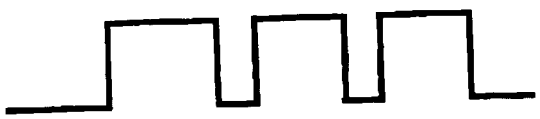
FIG. 5e VIDEO WITHOUT COPY PROTECTION 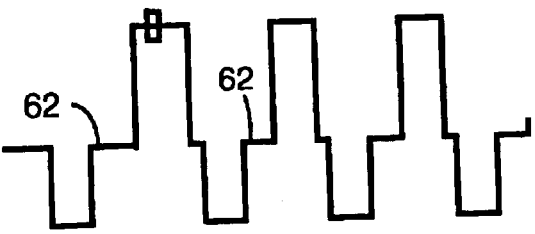

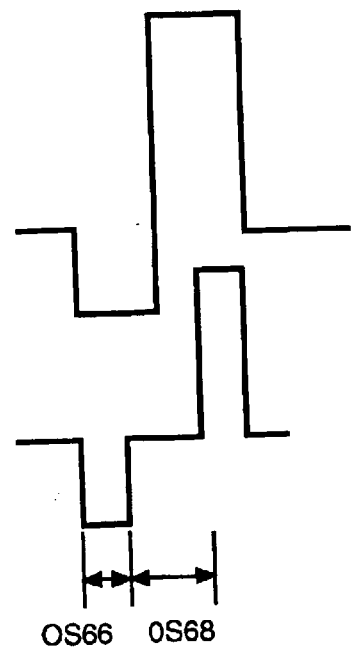
FIG. 6a
(PRIOR ART)
FIG. 6b
OS66　OS68
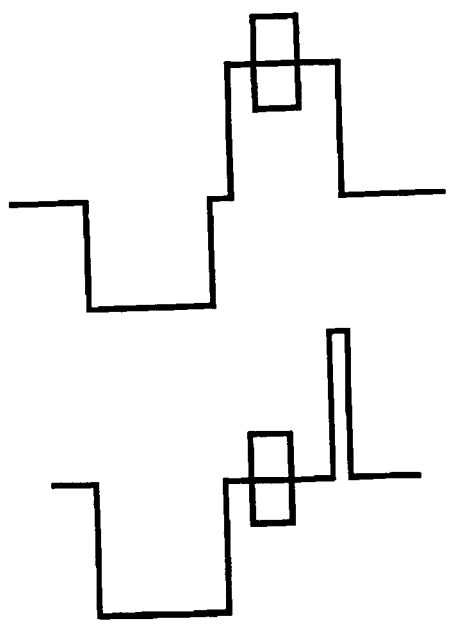
FIG. 6c
(PRIOR ART)
FIG. 6d
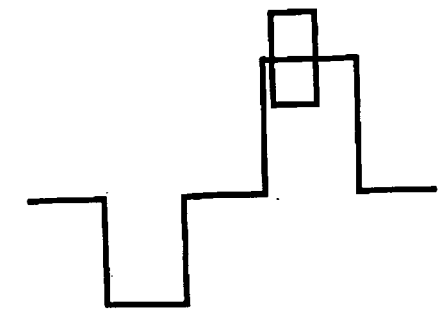
FIG. 6e

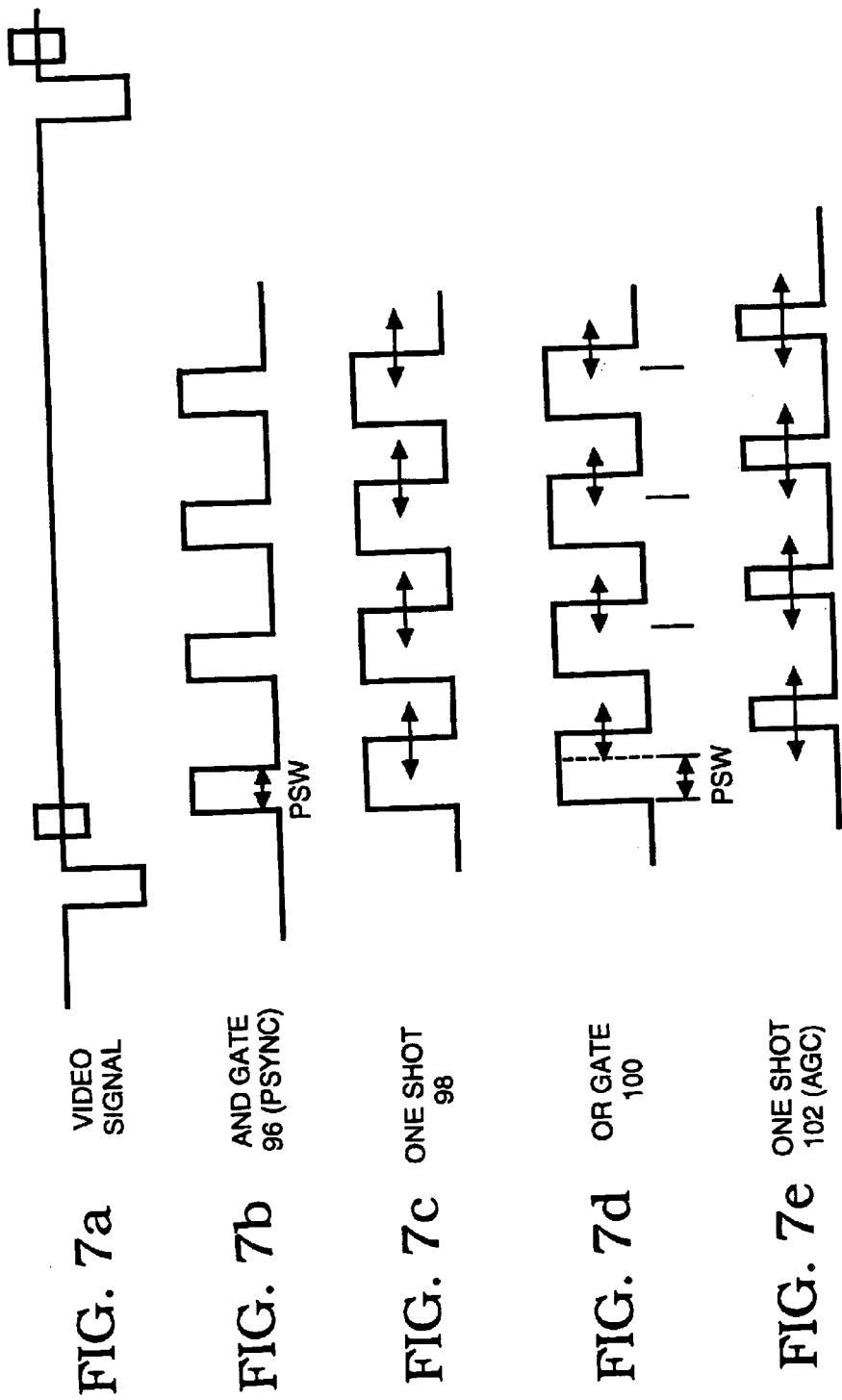

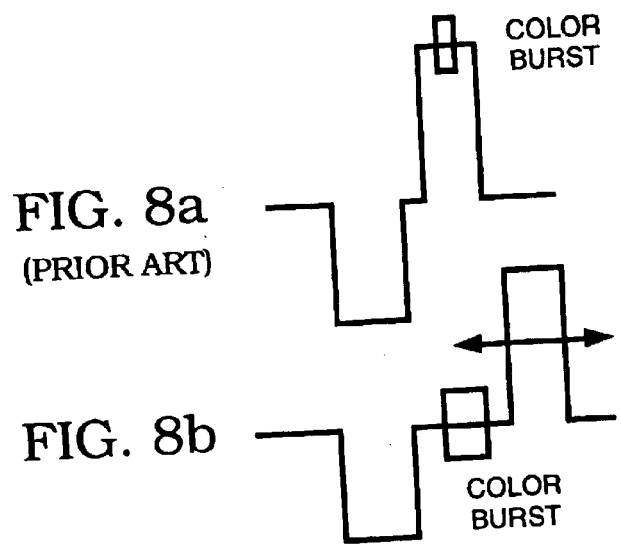
FIG. 8a (PRIOR ART)
FIG. 8b
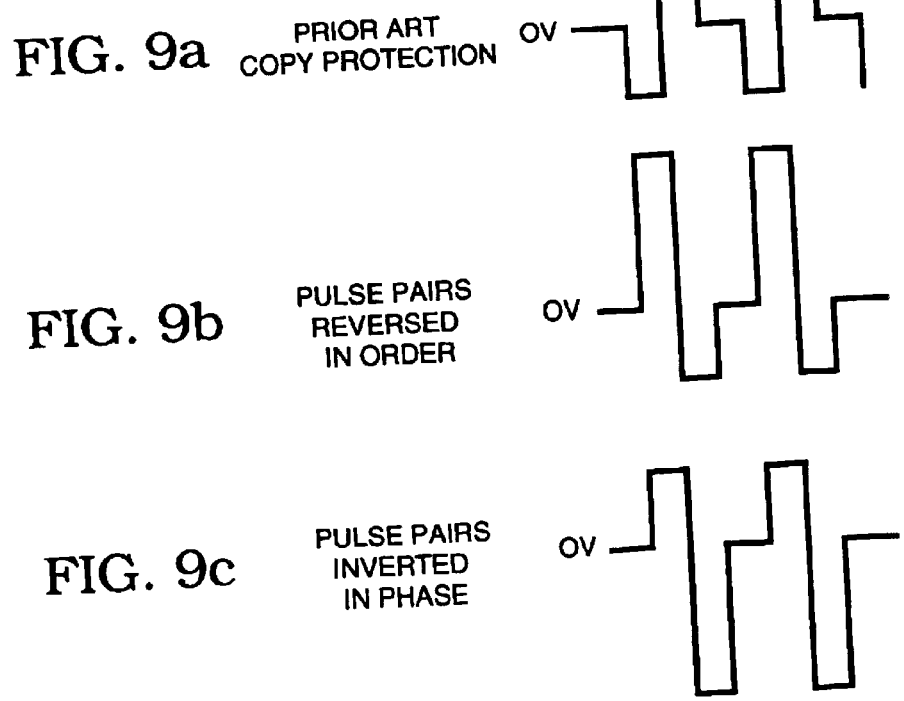
FIG. 9a PRIOR ART COPY PROTECTION
FIG. 9b PULSE PAIRS REVERSED IN ORDER
FIG. 9c PULSE PAIRS INVERTED IN PHASE

METHOD AND APPARATUS FOR SYNTHESIZING AND REDUCING THE EFFECTS OF VIDEO COPY PROTECTION SIGNALS

This application claims benefits of Provisional 60/098,804 filed Sep. 2, 1998.

CROSS REFERENCE TO RELATED APPLICATIONS

This invention is related to commonly owned U.S. Pat. No. 4,631,603 entitled "METHOD AND APPARATUS FOR PROCESSING A VIDEO SIGNAL SO AS TO BE ABLE TO PROHIBIT THE MAKING OF ACCEPTABLE VIDEO TAPE RECORDINGS THEREOF" which issued on Dec. 12, 1986; to U.S. Pat. No. 4,695,901 entitled "METHOD AND APPARATUS FOR REMOVING PSEUDO-SYNC PULSES AND/OR AGC PULSES FROM A VIDEO SIGNAL" which issued on Sep. 22, 1987; to U.S. Pat. No. 4,907,093 for METHOD AND APPARATUS FOR PREVENTING THE COPYING OF A VIDEO PROGRAM" which issued Mar. 6, 1990; to U.S. Pat. No. 4,819,098 for "METHOD AND APPARATUS FOR CLUSTERING MODIFICATIONS MADE TO A VIDEO SIGNAL TO INHIBIT THE MAKING OF ACCEPTABLE VIDEO TAPE RECORDINGS" which issued on Apr. 4, 1989; to U.S. Pat. No. 5,157,510 for "METHOD AND APPARATUS FOR DISABLING ANTICOPY PROTECTION SYSTEM IN VIDEO SIGNALS USING PULSE NARROWING which issued on Oct. 20, 1992; to U.S. Pat. No. 5,194,965 for "METHOD AND APPARATUS FOR DISABLING ANTI-COPY PROTECTION SYSTEM IN VIDEO SIGNALS" issued on Mar. 16, 1993; to U.S. Pat. No. 5,625,691 for "METHOD AND APPARATUS TO DEFEAT CERTAIN COPY PROTECTION PULSES WITHIN A VIDEO SIGNAL" issued on Apr. 29, 1997; to U.S. Pat. No. 5,633,927 for VIDEO COPY PROTECTION PROCESS ENHANCEMENT TO INTRODUCE HORIZONTAL AND VERTICAL PICTURE DISTORTIONS" issued on May 27, 1997; to U.S. Pat. No. 5,748,733 for "METHOD AND APPARATUS TO REDUCE EFFECTS OF CERTAIN COPY PROTECTION PULSES WITHIN A VIDEO SIGNAL" issued on May 5, 1998; to U.S. Pat. No. 5,661,801 for "METHOD AND APPARATUS FOR STABILIZING AND BRIGHTENING PRERECORDED TV SIGNALS ENCODED WITH COPY PROTECTION" issued on Aug. 26, 1997; to U.S. Pat. No. 4,336,554 for "CODE SIGNAL BLANKING APPARATUS" issued on Jun. 22, 1982 and to U.S. Pat. No. 5,583,936 for "VIDEO COPY PROTECTION PROCESS ENHANCEMENT TO INTRODUCE HORIZONTAL AND VERTICAL PICTURE DISTORTIONS" issued on Dec. 10, 1996. All of the above are incorporated by reference.

Also related is U.S. Pat. No. 4,163,253 for "METHOD APPARATUS FOR MODIFYING A VIDEO SIGNAL TO PREVENT UNAUTHORIZED RECORDING AND REPRODUCTION THEREOF" issued on Jul. 31, 1979.

BACKGROUND OF INVENTION

1. Field of the Invention

The field of the invention is in the mechanisms and/or methods for defeating, removing, or reducing the effects of the video copy protection signals. These mechanisms are also used to synthesize and improve the performance of a video copy protection signal.

2. Description of the Prior Art

The Hollywood movie industry is very concerned about the unauthorized copying of movies and programs. As an example, on Sep. 17, 1997 Jack Valenti, President and Chief Executive Office of the Motion Picture Association of America stated "If you can't protect what you own—You don't own anything." The patent by Ryan, U.S. Pat. No. 4,631,603, incorporated by reference, discloses a way to process an ordinary program video source to have copy protection. The copy protected video is viewable on a TV set but it produces a recording lacking any entertainment value. That is, the video programs that are not recordable suffer from artifacts ranging from low contrast to synchronizing problems. The '603 patent describes a method for "confusing" or causing misoperation of the AGC system in a videocassette recorder while not causing a black depression problem in a television receiver displaying the copy protected signal.

A Polish Patent Application (PL 304477 ('477)) by Tomasz Urbaniec entitled "Method and Device for Protecting Videophonic Recordings Against Authorized Copying" filed Jul. 28, 1994, hereby incorporated by reference, discloses a variation of the '603 patent by Ryan. FIG. 1a of the '603 patent describes the waveform of the copy protected video signal as disclosed by Ryan and is replicated herein as FIG. 1a. FIG. 4 of the Urbaniec patent '477 describes the comparative waveform as disclosed by Urbaniec, which is replicated herein as FIG. 1(b).

As is well known in the art, the videocassette system has a limited luminance frequency response, less than 2 MHz. A signal as described by Ryan recorded on a videocassette duplicating recorder with the AGC turned off (to avoid the effects of copy protection) will produce a video signal with pulse shapes modified by the limited frequency response of the duplicating recorder. Since there is no gap between the pseudo sync pulses and the AGC pulses of Ryan, the AGC system of a home duplicating recorder will respond to the combination of the pseudo sync pulses and the AGC pulses.

The limited bandwidth of the recording VCR responds slightly differently to the combination of pseudo-sync and AGC pulses separated by a time gap of 0.5 $\mu$seconds to 2.0 $\mu$seconds. If the time gap is as low as 0.5 $\mu$seconds, the limited bandwidth of the recording videocassette recorder distorts the time gap to effectively remove it and the effectiveness of the copy protection is essentially the same as that achieved by Ryan. As the gap widens, the effectiveness of the copy protection is reduced or removed.

To defeat the copy protection process, there are a number of known ways such as attenuating, blanking, narrowing, level shifting, modifying and/or clipping the copy protection pulses as described in U.S. Pat. Nos. 4,695,901 ('901), 4,336,554 ('554), 5,157,510 ('510), 5,194,965 ('965), 5,583, 936 ('936), 5,633,927 ('927), 5,748,733 ('733) and 5,661, 801 ('801) cited above and hereby incorporated by reference.

In the patents mentioned above, the AGC and/or sync or pseudo sync pulses (see U.S. Pat. No. 4,695,901) are changed in amplitude, changed in level relative to normal sync pulses, and/or changed in pulse width, so as to allow a satisfactory recording.

In particular, U.S. Pat. Nos. 5,194,965 and 5,157,510 disclose narrowing of the AGC and/or pseudo sync pulses so that the record VCR does not sense these narrowed added pulses and thus, makes a satisfactory copy.

SUMMARY OF THE INVENTION

To defeat the anti-copy signal, the present invention discloses a method and apparatus utilizing pulse position and pulse width modulation of the AGC and/or sync or pseudo sync pulses. The invention also discloses the insertion of a sufficiently wide time gap between the AGC and/or pseudo sync pulses such that the record VCR will respond to or sense the sync or pseudo sync pulses but still will allow for a recordable copy.

The copy protection defeating mechanisms of this invention can also be used in combination with any of the defeat inventions mentioned above. For example, to defeat the copy protection process, one can shift (delay) the AGC pulse by about 1.5 µseconds away from the preceding pseudo sync pulse and then trim the trailing edge of the preceding pseudo sync pulse by 0.6 µsecond. Thus a gap of about 2.1 µseconds exists between the trailing edge of the trimmed pseudo sync pulse and the leading edge of the delayed AGC pulse. If this gap is, for example, near blanking level for 2.1 µseconds, then the VCR will sample the voltage in the gap instead of the added AGC pulses for its AGC amplifier. By sampling this gap voltage near blanking level, the copy protection signal is then nullified. Alternatively, the gap voltage level may be set above or below blanking level. It is important to note that by simply delaying or shifting the position of the leading edge of the AGC pulse relative to the trailing edge of the pseudo sync pulse, the gap between the pseudo sync pulses and the AGC pulses will nullify or partially nullify the effects of the AGC copy protection signal. It is also possible to create this gap in other ways such as moving the trailing edge of pseudo sync pulse away from the leading edge of the upcoming AGC pulse, or some combination of moving the position of both the AGC pulse and pseudo sync pulse to form a gap that would defeat the copy protection process. Typical gap durations of 1.5 µseconds or more have proved effective in defeating the copy protection signal. Compounding the narrowing of the pseudo sync pulses and/or AGC pulses with this gap further enhances defeating the copy protection signal.

It should be noted that the defeat method as described above can be varied and then used as a copy protection signal. By dynamically varying the gap from zero to greater than 1.5 µseconds between the trailing edge of the pseudo sync pulse relative to the leading edge of the upcoming AGC pulse, a new copy protection signal is made to effectively mimic the Ryan '603 patent with amplitude modulated AGC pulses. By varying the gap via position modulation of the pseudo sync pulses relative to the AGC pulse or vice versa, or dynamically narrowing or changing the pulse width of the added pulses (AGC pulse and/or sync or pseudo sync pulse), an easier copy protection implementation is possible in the digital domain and/or analog domain. Today's digital domain is the format of choice for implementing copy protection in cable systems and the like (i.e. digital versatile disc players). The range of pulse widths can be for example, between about 50% to 100% of the normal pulse widths (i.e. the pseudo sync pulse normal widths are about 2.3 µseconds and the AGC normal widths are about 2.3 µseconds to 3 µseconds depending on how many added pulses are in a television (TV) line).

In general the copy protection process of the invention may start having the added pulse pairs as for example in FIG. 2(a) of Ryan '603 patent, where the AGC pulse and/or pseudo sync pulse are position separated relative to time. If the gap due to position separation is insufficient to "turn off" the copy protection process (i.e. position modulation amounts to only 1.0 µsecond of gap), then the AGC pulse and/or pseudo sync pulse can be narrowed as a function of time to increase the gap sufficiently (i.e. slowly trim or narrow the AGC pulse and/or pseudo sync pulse by about 0.35 µsecond each, which would add another 0.7 µsecond to the 1.0 µsecond gap for a increased gap duration of 1.7 µseconds). After the gap has been extended as to "defeat" or turn off the copy protection signal, then the new copy protection signal is reactivated by reducing the separation (for example, to zero) between the AGC pulse and pseudo sync pulse and by restoring the pulse widths of the (trimmed or narrowed) AGC pulses and/or pseudo sync pulse to their full normal pulse widths.

The method of using relative position modulation between the sync and AGC pulses for defeating and/or synthesizing a copy protection signal can be applied to the copy protection pulses within or around a horizontal blanking interval. The method can also be combined with narrowing any portion of the added pulses.

In order to produce a further effective copy protection signal, a variation of the U.S. Pat. No. 4,631,603 patent has been developed. To this end, the AGC pulses also are amplitude modulated from full amplitude to zero and vice versa over the period of for example about 20 to 30 seconds. As a result, the illegal copy will have constantly changing brightness levels. This causes more annoyance when compared to a constant dim picture (when the AGC pulses are static and at full amplitude).

BRIEF DESCRIPTION OF THE DRAWINGS

FIG. 2 also shows a way of dynamically shifting the position of the AGC pulse to provide the copy protection process of the invention;

FIG. 3 also shows a way of dynamically shifting the position and then narrowing the AGC pulses in accordance with the copy protection process of the invention;

FIGS. 5a to 5e illustrate the waveforms generated at various points in the circuit of FIG. 5;

FIGS. 6a to 6E illustrate several waveforms related or generated by the circuit of FIG. 6 given typical copy protection signals as an input;

FIGS. 7a to 7e illustrate the relevant waveforms that are generated at various points in the circuit of FIG. 7;

FIGS. 8a and 8b illustrate position delay or modulation of the raised back porches as mentioned in '098 which can be used as a defeat process or as a copy protection signal. By varying the gap between the trailing edge of (horizontal) normal sync pulses and their raised back porch AGC pulses, the VCR will respond to these as if the raised back porch AGC pulses are being amplitude modulated up and down, which results in yet another dynamic copy protection process of the invention;

FIG. 9a illustrates a prior art copy protection signal. FIG. 9b illustrates a defeating or modifying method by reversing at least portions of the pseudo sync and/or AGC pulses. FIG. 9c illustrates another method for defeating or modifying the original process (FIG. 9a for example) by phase shifting (i.e., inverting) portions of the pseudo syncs and/or AGC pulses;

DESCRIPTION OF THE PREFERRED EMBODIMENTS

Figure 1A:
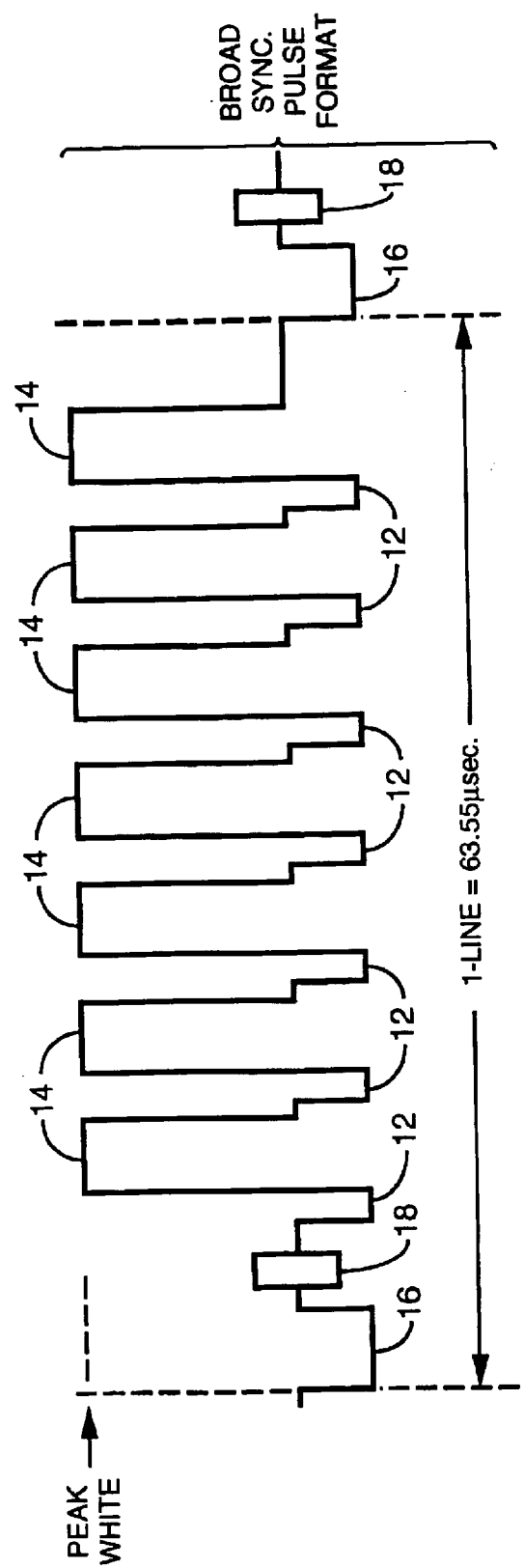
FIG. 1a illustrates a the basic anticopy process consisting of AGC and pseudo sync pulses.
Figure 1B:
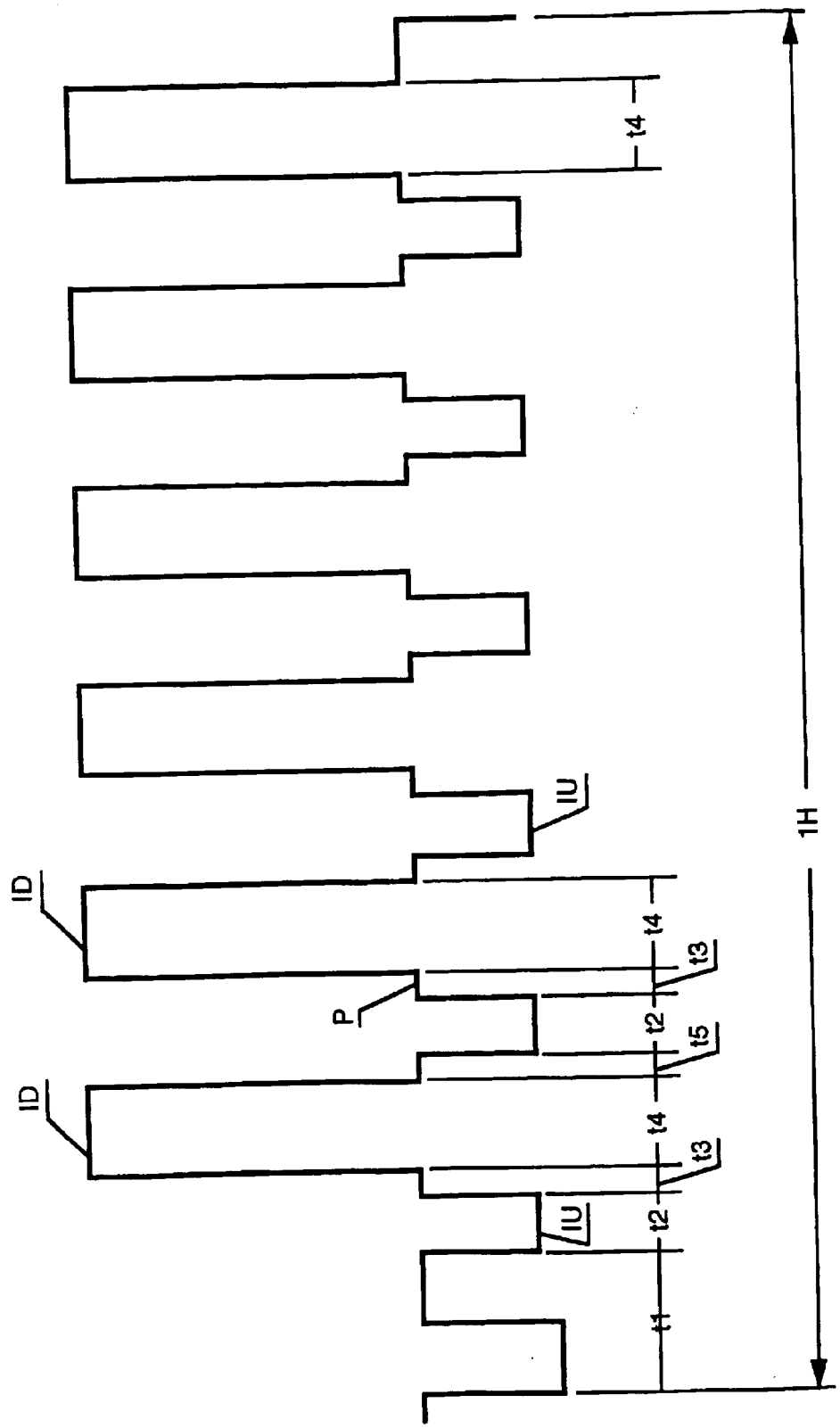
FIG. 1b illustrates the Urbaniec modification to the basic anticopy process consisting of AGC and pseudo sync pulses.

As previously discussed, FIGS. 1a and 1b illustrate prior art copy protection and copy protection defeating signals, respectively.

Figure 2:
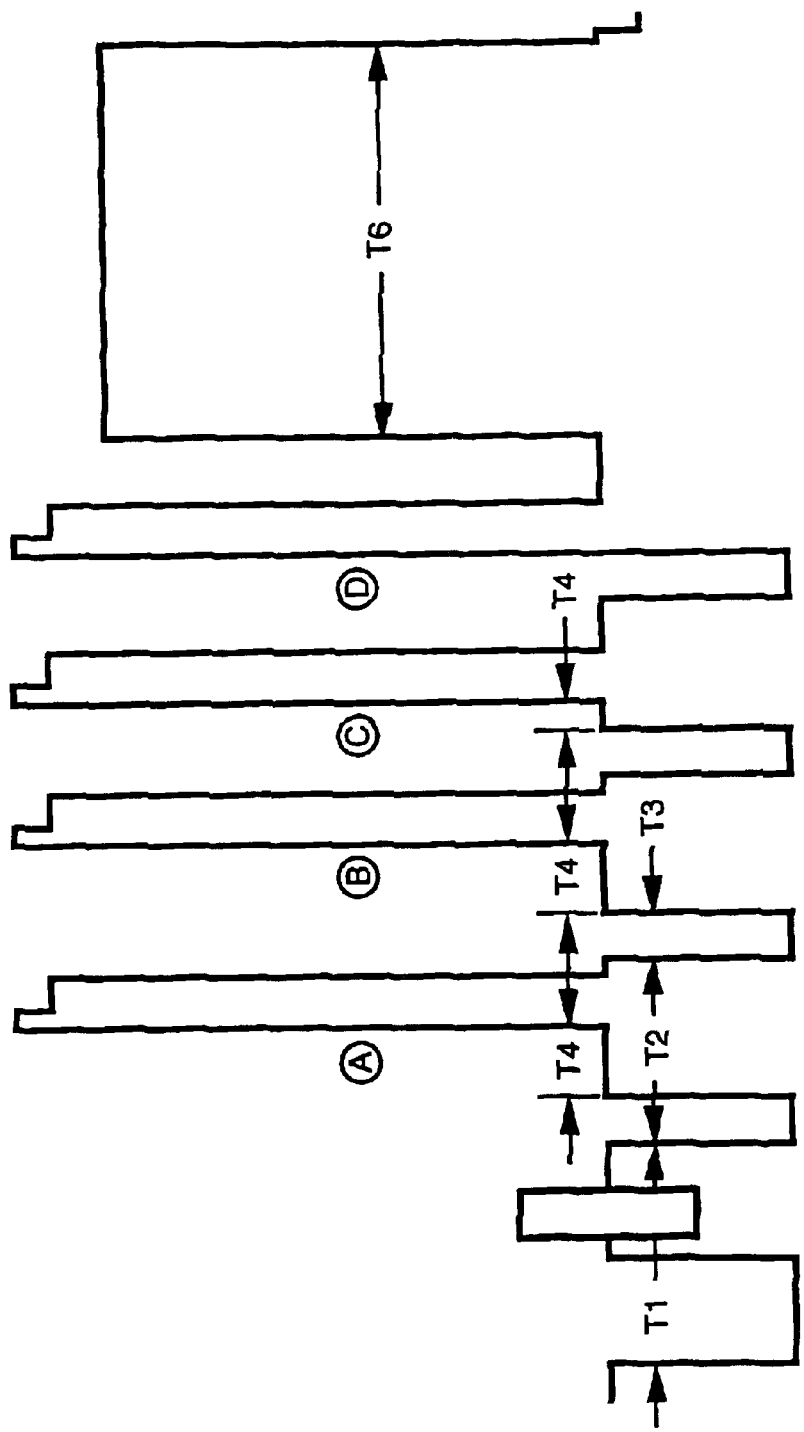
FIG. 2 illustrates various ways to position shift the AGC pulse to defeat the copy protection signal.

FIG. 2 illustrates various waveforms corresponding to ways that AGC pulses can be delayed to provide the copy protection defeating technique of the invention. First, the waveform D in FIG. 2 illustrates the AGC pulse and pseudo sync pulse at the normal position previously shown in FIG. 1a which causes copy protection. Waveforms A to C show various delays or gaps between the trailing edge of pseudo sync pulse and the leading edge of the respective AGC pulse. Waveforms A and B are effective in turning off the copy protection signal while waveform C causes partial reduction or turn off of the copy protection signal. For effective defeat of the copy protection signal it follows that waveforms A and B are preferable.

For a new copy protection signal that is dynamically varied from on to off, one technique of the invention starts for example, with several seconds of the waveform D of FIG. 2 (copy protection on) then transitions to the waveform C of FIG. 2 (copy protection partially on) and then transitions to the waveform B of the FIG. 2 (copy protection turned off). The gap, or separation T4, in FIG. 2 is preferably continuously or discretely changing from zero to greater than about 1.5 μseconds. Waveform A is used to turn copy protection off.

In FIG. 2 (as well as FIGS. 3, 4) the time interval T1 defines the normal sync to the first pseudo sync pulse period, T2 defines the repetition rate of added pseudo sync pulses, T3 defines the pseudo sync pulses' width and T4 defines the gap duration. T6 designates the width of a white reference pulse which may be included as an option.

Figure 3:
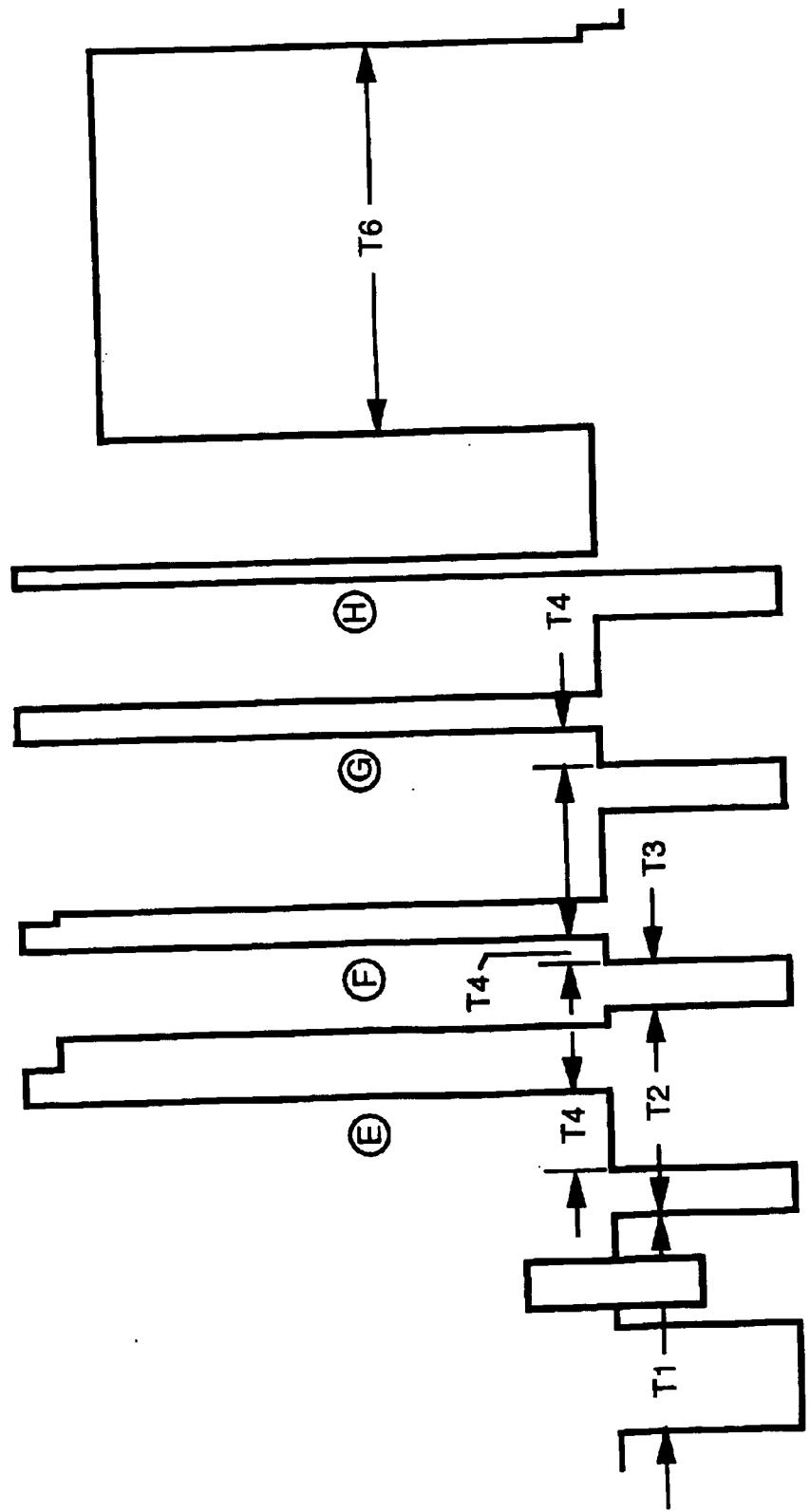
FIG. 3 illustrates a combination of position shifting and narrowing (trimming) the AGC pulses to defeat the copy protection signal.

FIG. 3 illustrates a variation of the embodiment of FIG. 2 with AGC pulse narrowing, although the pseudo sync pulses can be narrowed as well. In the waveform H of FIG. 3, the pulse resembles a narrowed AGC pulse in the patents '510 and '965 of previous mention. While waveform H of FIG. 3 can be used for defeating copy protection signals, it can again also be used as part of a copy protection signal. The waveform D of FIG. 2 represents a normal copy protection signal which can transition to the waveform H of FIG. 3, a signal with a narrowed AGC pulse, and then transition to waveform F of FIG. 3, a signal with a gap and narrowed AGC pulse. Finally the copy protection signal can be turned off by a transition to the waveform G of FIG. 3, where the gap is larger with a narrowed AGC pulse. Waveform E of FIG. 3 is equivalent to waveform A of FIG. 2 and is used to defeat copy protection.

Figure 4:
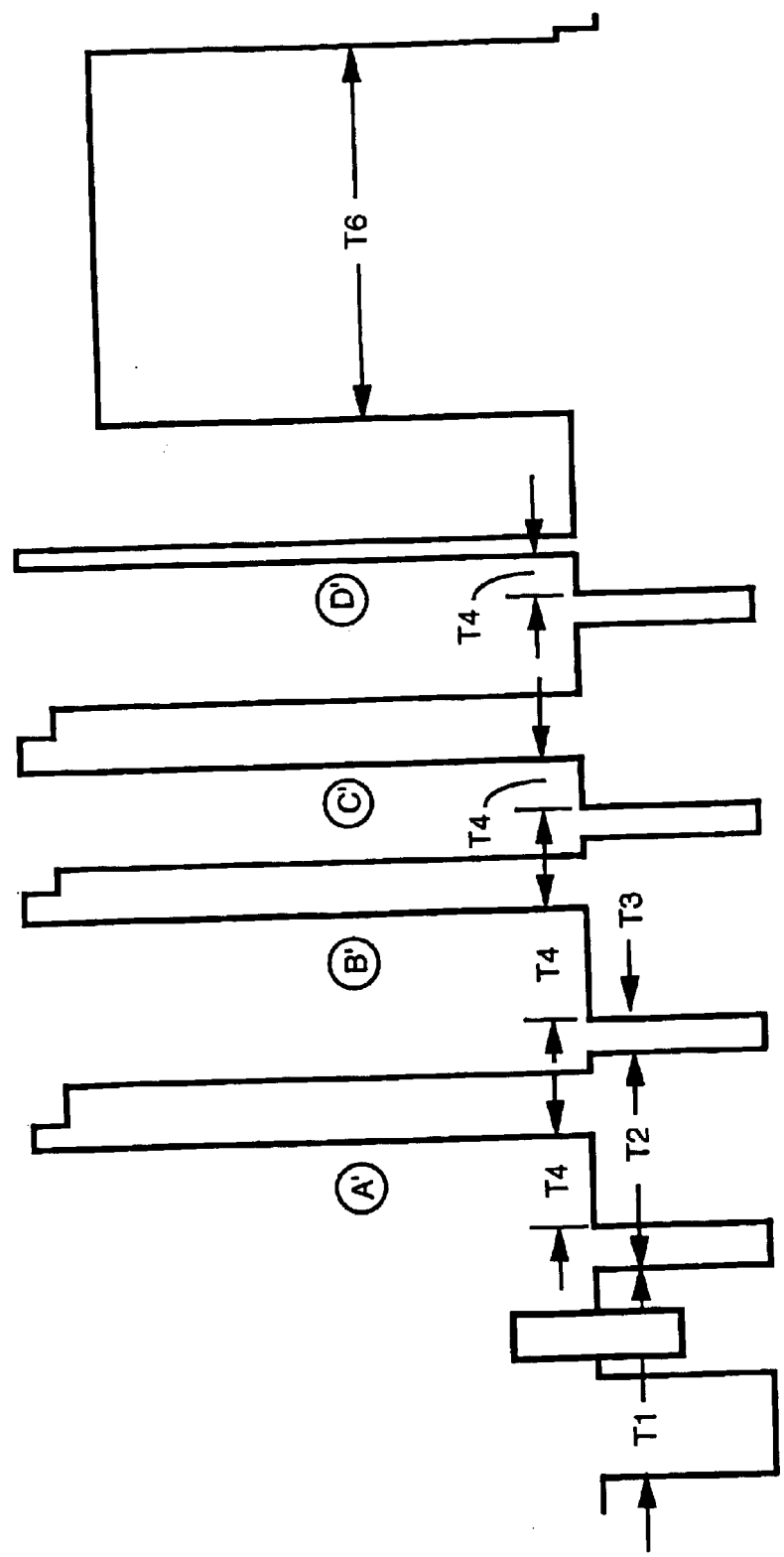
FIG. 4 illustrates various ways to shift the relative position between AGC pulses and pseudo sync pulses while narrowing pseudo sync and/or AGC pulses to defeat the copy protection signal. If the positional shifting and narrowing of AGC pulses and/or pseudo sync pulses is done from zero to maximum, then this technique can be used as the copy protection signal of the invention.

FIG. 4 illustrates pseudo sync pulse narrowing combined with position delay or modulation of varying pulse widths of the AGC pulses to defeat the copy protection process, or form a dynamic copy protection signal.

The waveform D' of FIG. 4 illustrates a defeat process not illustrated in the patents of previous mention by Quan et al '510 and '965. In waveform D' of FIG. 4 the pseudo sync pulse's trailing edge is advanced to provide a narrowed pseudo sync followed by a delayed AGC pulse leading edge to provide a narrowed AGC pulse. The waveform C' of FIG. 4 illustrates a further gap increase in duration between the AGC pulse by position delaying the AGC pulse using an advanced trailing edge to narrow the pseudo sync pulse. The waveform B' of FIG. 4 illustrates a combination of position separation between the AGC pulse and the pseudo sync pulse with narrowed AGC and pseudo sync pulses. As may be seen, waveform A' is generally the equivalent of waveforms A and E of FIGS. 2 and 3, respectively, and also may be used to defeat the effects of copy protection signals.

Alternatively, by employing narrowed pseudo sync pulses and/or AGC pulses that are varied in width, FIG. 4 provides a dynamic copy protection signal of the invention based on dynamically changing the gap (separation) and the amount of narrowing on pseudo sync pulses and/or AGC pulses. For example, the embodiment may start with a waveform D as illustrated in FIG. 2 to provide the copy protection process, then provide narrowing of the AGC pulses and/or pseudo sync pulses to achieve partial copy protection via the waveform C' in FIG. 4, and then transition to a signal such as waveform B' in FIG. 4 to turn off the copy protection. The embodiment then reverses the cycle from waveforms B', to C' and back to D to restore the copy protection.

Figure 5:
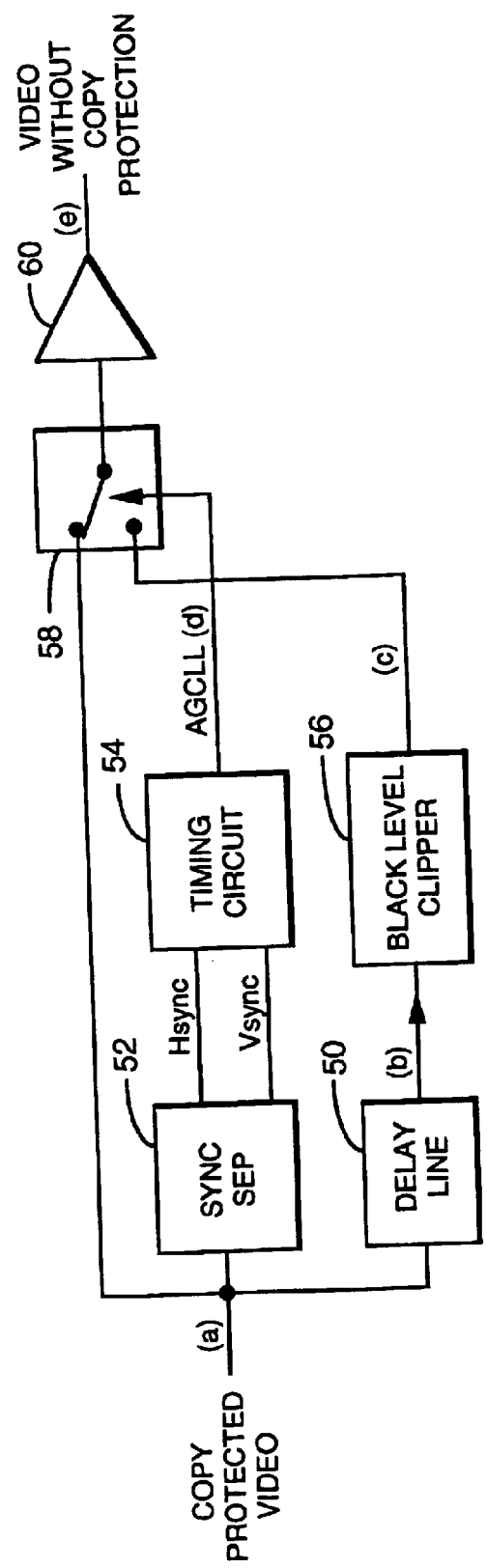
FIG. 5 illustrates a block diagram of an apparatus for defeating a copy protection signal by delaying the AGC pulses.

FIG. 5 is a block diagram depicting an example of circuitry for defeating the copy protection pulses by delaying the AGC pulses relative to the pseudo sync pulses. To this end, copy protected video is inputted as at (a) to a delay line circuit 50, which delays the input video, and also to a sync separator circuit 52. The output of the sync separator circuit provides horizontal and vertical sync pulses to a timing circuit 54 which in turn outputs pulses at (d) coincident with the video lines containing raised back porch AGC pulses and those with AGC pulses. This output signal, AGCLL, is logic high at least from the leading edge of the AGC pulses of the input video signal to the trailing edge of the AGC pulses which appear at an output (b) of the delay line circuit 50 (delayed input video of about 1.5 μseconds or more). A black clipper circuit 56 coupled to the delay line 50 clips off most or all of the sync pulses. Thus, delayed AGC pulses are supplied at the output (c) of the black clipper circuit. By using an electronic switch 58, with control signal AGCLL to switch in the delayed AGC pulses, the copy protection pulses' effects are then defeated or reduced at the output (e) of an amplifier 60.

FIGS. 5a through 5e illustrate the waveforms generated at different locations of FIG. 5 and is generally self-explanatory. For example, in FIG. 5e, the output has a gap, that is, separation 62, corresponding to gap T4 of FIGS. 2–4, long enough between the sync pulses and AGC pulses to allow recordable copies of the video signal. It should be noted that FIG. 5 is just an illustration of an apparatus for producing position delay of AGC pulses to defeat the copy protection signal. It is also possible to design a position delay equivalently by removing substantially the original copy protection signal or parts of it and then regenerating modified pseudo sync pulses and/or AGC pulses. For instance, the incoming copy protection pulses may be removed and then the pseudo sync pulses inserted in advance of the original pseudo sync pulse, with AGC pulses inserted in delayed relation to the original AGC pulses. Thus a gap voltage is produced between the pseudo sync pulses and AGC pulses that allows for a recordable copy.

Figure 6:
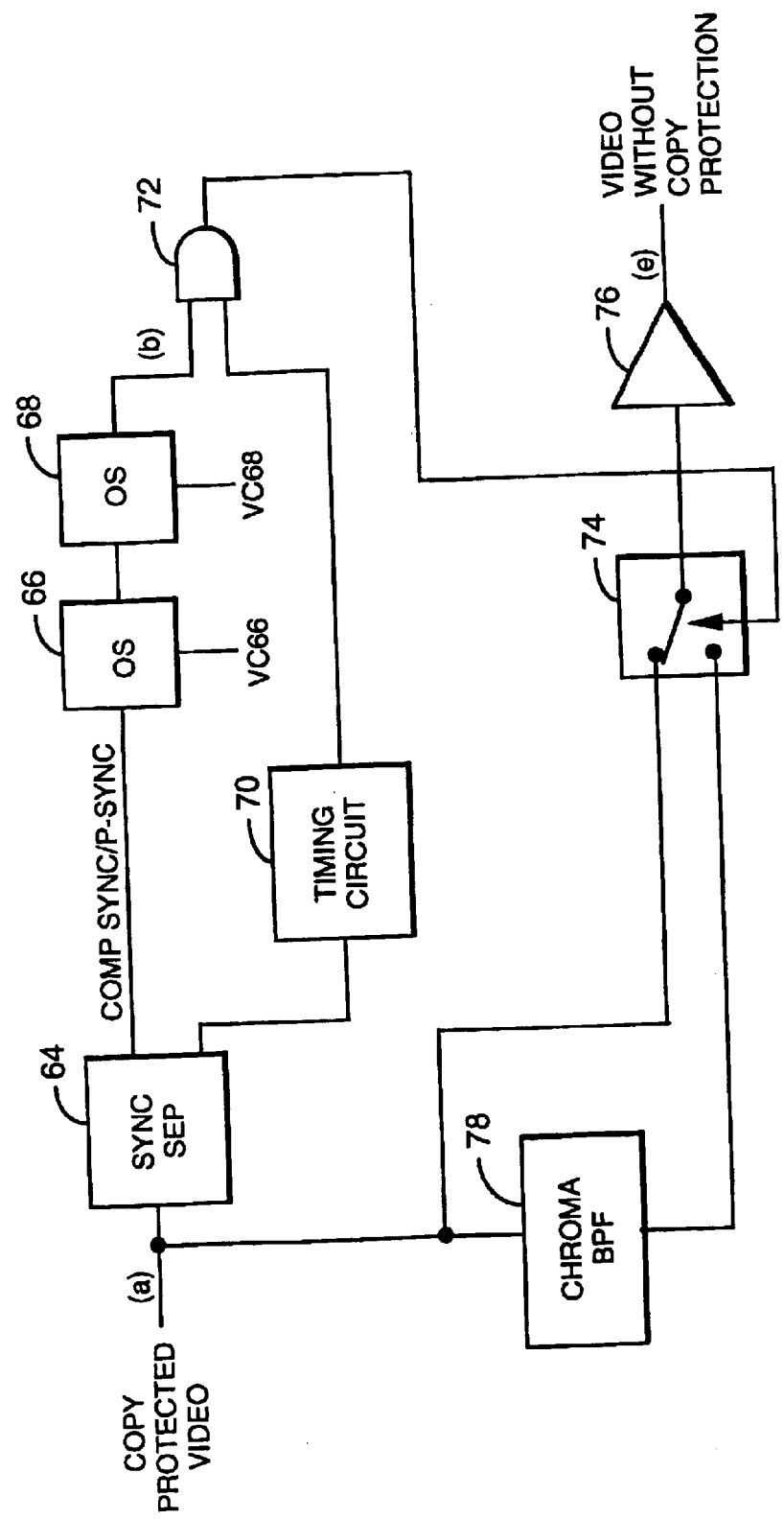
FIG. 6 illustrates an apparatus for defeating a copy protection process by inserting a time gap between the pseudo sync pulses and the AGC pulses.

FIG. 6 is a block diagram depicting circuitry for creating a time gap around blanking level by trimming off (advancing) the trailing edge of sync and delaying the leading edge of the AGC pulse of the copy protection signal, leading to a recordable copy. This "trimming" is a different form of narrowing not illustrated in the U.S. Pat. No. 5,194,965. Copy protected video is fed at (a) to a sync separator 64 to output composite sync including pseudo sync pulses to a one shot (multivibrator) 66. One shot 66 triggers off the leading edge of sync pulses including pseudo sync pulses, and its pulse width can be controlled via a control voltage VC66. The output (b) of one shot 66 is coupled to another one shot 68 whose pulse width is controlled by another control voltage, VC68. The output (b) of one shot 68 is then a pulse coincident with the latter portion of the sync or pseudo sync pulse and the beginning portion of the AGC pulse of the copy protected input video signal. A sync separator output also is fed to a timing circuit 70 which generates pulses coincident with the copy protection signal within the video lines. The output of the timing circuit 70 and of the one shot 68 are fed to an AND gate 72 to control a switch 74 during the times copy protection pulses are present. The switch 74 receives the copy protected video at (a) and supplies a signal containing a gap voltage between the sync and AGC pulses of copy protection signals, whereby the video signal at an output (e) of an output amplifier 76 allows for a recordable copy. FIG. 6 also uses a chroma bandpass filter 78 to generate the gap, but also to reinsert color burst during narrowing of the normal sync and/or raised back porch. As a matter of fact narrowing and/or attenuation and/or level shifting of any kind on the raised back porch AGC pulses and/or its sync signal can result in a recordable copy (see raised back porch AGC signal as in FIG. 3 of U.S. Pat. No. 4,819,098 by Ryan).

FIGS. 6a to 6e show the result of this kind of narrowing. FIG. 6a represents a typical copy protection signal consisting of pseudo sync pulses and AGC pulses. FIG. 6b shows the narrowed pseudo sync pulses and/or AGC pulses with a gap (voltage) in between. FIG. 6c shows a horizontal pulse with a raised back porch AGC pulse in typical fashion of a copy protection signal. FIGS. 6d and 6e show the result of the apparatus of FIG. 6 which narrows the raised back porch AGC pulse (FIG. 6d) and/or the horizontal sync pulse (FIG. 6e) to allow a recordable copy. Note in FIG. 6e the color burst is still present even after narrowing, in the area where burst is normally located.

Figure 7:
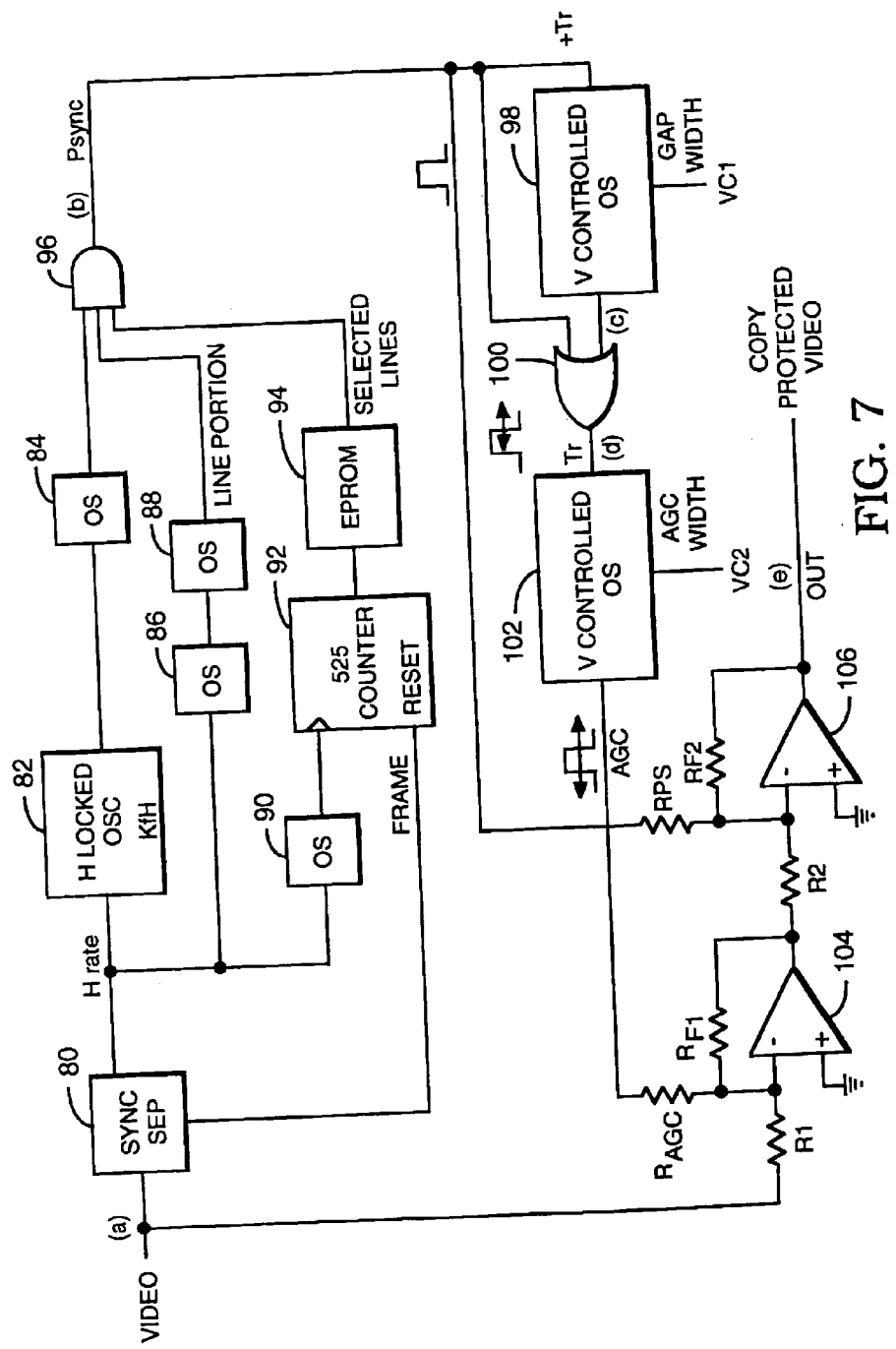
FIG. 7 illustrates copy protection apparatus of the invention that generates a dynamically variable time gap (around blanking level) between the trailing edge of pseudo sync pulses and the leading edge of AGC pulses.

FIG. 7 is a block schematic diagram depicting circuitry for generating a copy protection process of the invention that mimics the amplitude modulation of AGC pulses by position modulation. Program video with or without copy protection is the input video signal supplied at input (a) to a sync separator 80, which in turn outputs horizontal rate pulses. These horizontal rate pulses are coupled to a horizontal locked (triggered) oscillator 82. The output of this oscillator is preferably but not necessarily locked to the horizontal frequency at a higher frequency (i.e. 4 cycles per half a video line). A one shot (multivibrator) timer circuit 84 defines the positive pulse duration of the horizontal locked oscillator 82. Meanwhile, the sync separator 80 also outputs the horizontal rate pulses to a one shot 86, whose output is coupled to a one shot 88. The latter supplies a gating pulse for the location of pseudo sync pulses in the video line (i.e. 32 μseconds or first half of the video line). The location of the respective video lines that will contain the copy protection pulses is generated by a circuit consisting of a one shot 90, a (525) line counter 92 and an EPROM circuit 94. From the sync seprator 80, horizontal pulses are supplied to the one shot 90 whose output is coincident with the beginning of the video line. A frame reset pulse is fed to the 525 line counter 92 (i.e. for NTSC) along with the horizontal rate pulses for the counter's clock. The counter's output is used to address the memory circuit of EPROM 94, which is programmed to output logic high pulses coincident with those video lines that will have the copy protection pulses. The output (b) of an AND gate 96 then comprises "inverted" pseudo sync pulses on selected video lines (i.e., in the vertical blanking interval).

One method for generating position modulated AGC pulses is to induce pulse width modulation on an inverted pseudo sync pulse signal and then trigger off the trailing edge of this pulse width modulated inverted pseudo sync pulse signal to generate AGC pulses. To this end, the output of AND gate 96 triggers a voltage controlled one shot timer 98 on the leading edge of an "inverted" pseudo sync pulse signal. The output (c) of one shot timer 98 is a pulse with a minimum width of the output of AND gate 96, and a maximum pulse width of 1.5 μseconds (or more) than its minimum pulse width. For example if the output of AND gate 96 has a pulse width of 2.3 μseconds, then the output of one shot timer 98 has pulse widths that vary according to voltage control VC1 from 2.3 μseconds to at least 2.3 μsecond+1.5 μseconds or at least 3.8 μseconds. The output of one shot timer 98 is OR'd by an OR gate 100 with the output of AND gate 96 to ensure that the output (d) of OR gate 100 has a minimum width of the "inverted" pseudo sync pulse from the AND gate. The output of the OR gate 100 triggers on the trailing edge to output AGC pulses whose widths can be controlled voltage wise via a voltage control VC2 supplied to a voltage controlled one shot timer 102. The output of one shot timer 102 then provides AGC pulses that are varying in delay from the pseudo sync pulses' trailing edge on the order of from zero to at least 1.5 μseconds. The output of one shot timer 102 (AGC pulses) is fed to a summing amplifier 104 along with the input video signal. The output of the inverted pseudo sync pulse from AND gate 96 is negatively summed with the output of amplifier 104 via a (negative) summing amplifier 106. The output (e) of amplifier 106 then has position modulated AGC pulses relative to the pseudo sync pulses and is thus a dynamic copy protection signal.

Note FIG. 7 illustrates that the AGC pulses also can be pulse width modulated if the one shot timer 84 is voltage controlled. FIGS. 7a to 7e show the wave forms generated at various locations (a)-(e) in the circuit of FIG. 7.

FIGS. 8a, 8b illustrate that the circuit of FIG. 7 can be applied to copy protection pulses with normal sync and raised back porch AGC pulses such as exemplified by FIG. 7a. Thus FIG. 8b shows a dynamic position modulated copy protection signal that modifies the technique of FIG. 3 of U.S. Pat. No. 4,819,098. The signal shown in FIG. 8b can occur in clusters or in selected video lines.

It should be noted that the copy protection process of the present invention can have position, pulse width and/or gap width modulation, and/or amplitude modulation, done on individual pseudo sync pulses, horizontal sync pulses, AGC pulses or raised back porch AGC pulses, over time from maximum separation (defeated copy protection) to minimum separation (full copy protection). For instance if there are 40 added pulse pairs of normal pseudo sync pulses and AGC pulses, one can in any combination slowly increase the separation between the AGC pulses and pseudo sync pulses in any number of pulse pair(s) at a time or all of them at a time until sufficient pulse pairs of copy protection pulse pairs have maximum separation to turn off copy protection. Additionally, one can in any combination slowly decrease the separation from maximum separation (defeated copy protection) to minimum separation (full copy protection).

As a further example, copy protection signals can be applied throughout the vertical blanking interval and its vicinity, and the copy protection signals can include different amounts of added pulses per video line. In one embodiment for example, a single pseudo sync pulse and/or AGC pulse in a video line can be modulated. As previously mentioned, the AGC or raised back porch AGC pulses also can be amplitude modulated in combination with the above-mentioned processes.

FIG. 9a depicts a waveform of a prior art copy protection signal. FIG. 9b depicts a waveform of a defeating or modifying method for the signal of FIG. 9a which reverses the order of at least portions of the pseudo sync and/or AGC pulses. FIG. 9c is a waveform of another method to defeat or modify the original process (FIG. 9a for example) by phase shifting, i.e., inverting, at least portions of the pseudo syncs and/or AGC pulses. In the case of FIG. 9c the phase shift is a 180 degree reversal of pseudo syncs and AGC pulses. Note that the methods described for FIGS. 9b and 9c can be applied to those copy protection pulses around or within the horizontal blanking interval. The methods described for FIGS. 9b and 9c can of course be combined with relative attenuation, pulse narrowing, level shifting, and/or position modulation copy protection defeating processes.

Also it is possible to use the techniques described for FIGS. 9b and 9c to synthesize a copy protection signal. To dynamically turn on and off the copy protection process for example, the technique starts with a copy protection signal as shown in FIG. 9a (copy protection effectively on). The technique continues for example, by slowly reversing the order of the pseudo syncs with the AGC pulses until the (modified) copy protection signal substantially becomes FIG. 9b (copy protection effectively off). Similarly, if the technique starts with FIG. 9a where the copy protection is fully on, then the copy protection process is slowly turned off by inverting (phase shifting), attenuating, level shifting and/or position modulating the pseudo syncs and/or AGC pulses until the (modified) copy protection signal becomes the signal depicted in FIG. 9c.

Figure 10:
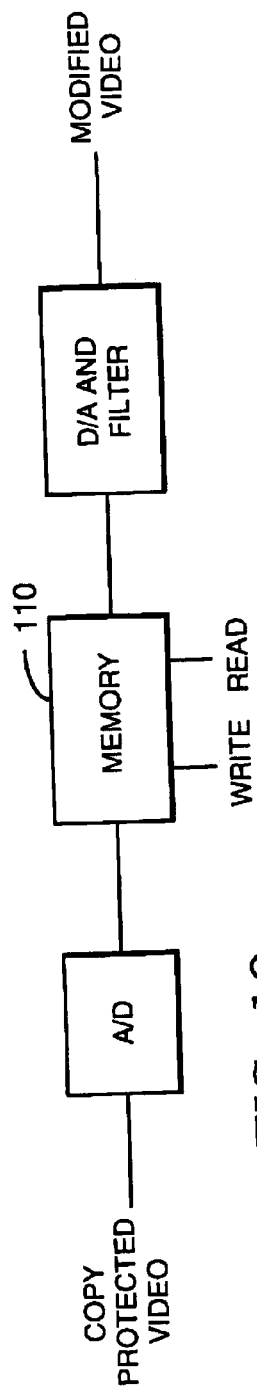
FIG. 10 is a block diagram illustrating a circuit for reversing at least portions of the pseudo sync and/or AGC pulses by way of a memory circuit.

Referring to FIG. 10, by using a video memory 110 and/or a regenerating signal, the waveform of FIG. 9a can be transformed to that of FIG. 9b. In this embodiment, the video memory 110 stores for example, the signal of FIG. 9a wherein however, the signal is read out of memory in reverse order to achieve the signal of FIG. 9b. Thus, the block diagram of FIG. 10 is an example of circuitry for implementing the latter signal reversing technique for all or selected portions of the pseudo syncs and/or AGC pulses.

Figure 11:
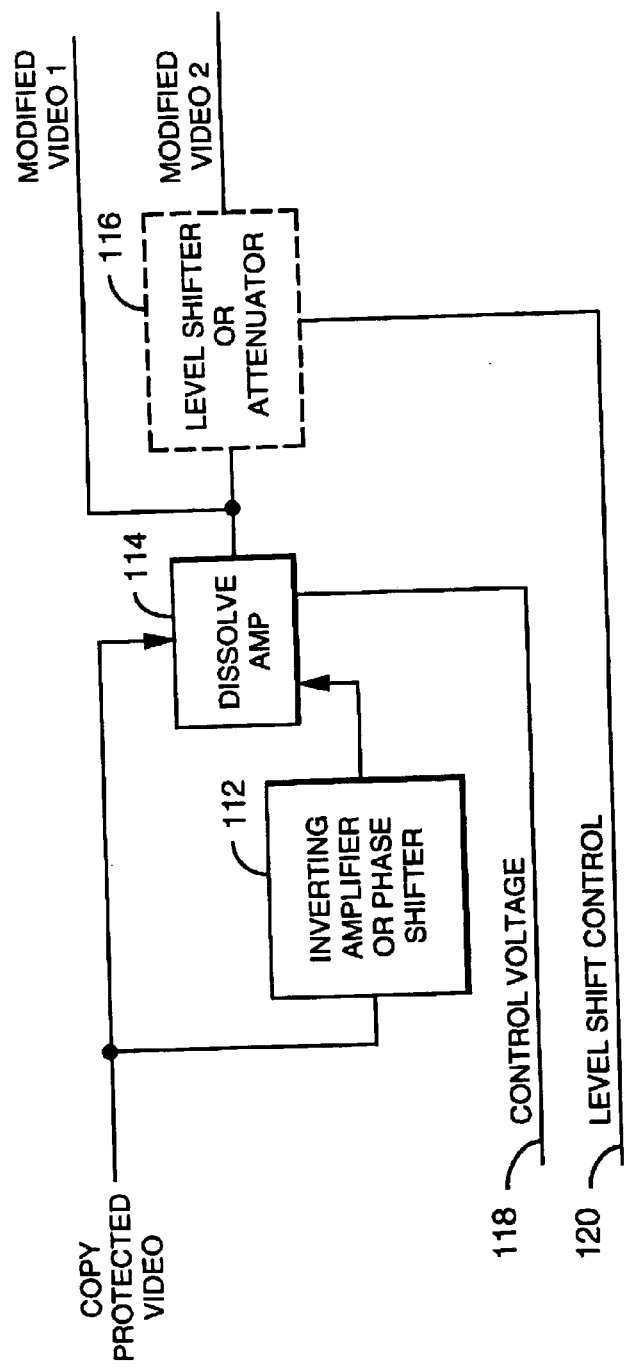
FIG. 11 is a block diagram illustrating a circuit for inverting or phase shifting portions of the pseudo syncs and/or AGC pulses by way of an inverting or phase shifting amplifier along with a switching or dissolving amplifier. An optional level shifting and/or attenuating circuit is also shown in FIG. 11.

FIG. 11 illustrates circuitry for providing the phase shifting technique of previous mention, which transforms the waveform of FIG. 9a to that of FIG. 9c. To this end, an inverting (or phase shifting) amplifier 112 inverts (phase shifts) the signal of FIG. 9a. A video mix dissolve amplifier 114 (or switcher) is used to transform or transition the waveform from that of FIG. 9a to that of FIG. 9c. The dissolve amplifier 114 is responsive to a control voltage 118. Accordingly, FIG. 11 illustrates circuitry for inverting or phase shifting at least portions of the pseudo syncs and/or AGC pulses by way of the inverting or phase shifting amplifier 112 along with the switching or dissolving amplifier 114. An optional level shifting and/or attenuating circuit 116 is also illustrated in FIG. 11 in phantom line. The level shifting/attenuating circuit 116 is responsive to a level shift control signal 120.

Although the invention has been described herein relative to specific embodiments, various additional features and advantages will be apparent from the description and drawings, and thus the scope of the invention is defined by the following claims and their equivalents.

What is claimed is:

1. A method of reducing the effects of copy protection signals in one or more selected video lines of a video signal being supplied to a recorder or television (TV) set, wherein the copy protection signals include sync and/or pseudo sync pulses together with respective automatic gain control (AGC) pulses, with the sync/pseudo pulses having a given small position separation, which can be zero separation, from the respective AGC pulses, comprising:

providing the sync/pseudo sync pulses with the trailing edge thereof having the small position separation from the leading edge of respective AGC pulses, wherein the small position separation maintains the copy protection effect; and shifting the relative position of either the trailing edge of the sync/pseudo sync pulses or the leading edge of the respective AGC pulses with respect to each other, or shifting the relative positions of the trailing edge of the sync/pseudo sync pulses and the leading edge of the respective AGC pulses, to provide a modified position separation between the trailing edge of the sync/pseudo sync pulses and the leading edge of the respective AGC pulses sufficient to reduce the effects of the copy protection signals.

2. The method of claim 1 including:

delaying the leading edge of the AGC pulses relative to the trailing edge of the respective sync/pseudo sync pulses by a time period commensurate with said modified position separation.

3. The method of claim 2 wherein the delay is in the region of 1.0 to 2.5 microseconds.

4. The method of claim 1 including:

advancing the trailing edge of the sync/pseudo sync pulses relative to the leading edge of the respective AGC pulses by a time period commensurate with said modified position separation.

5. The method of claim 4 wherein the advancement is in the region of 1.0 to 2.5 microseconds.

6. The method of claim 1 including:

delaying the AGC pulses in the region of 0.5 to 1.5 microseconds relative to respective sync/pseudo sync pulses, while advancing the trailing edge of the sync/pseudo sync pulses in the region of 0.5 to 1.5 microseconds relative to the delayed respective AGC pulses to obtain said modified position separation.

7. The method of claim 1 including:

narrowing the durations of the sync/pseudo sync pulses and/or the respective AGC pulses, in combination with the shifting of the relative positions of the sync/pseudo sync and respective AGC pulses.

8. The method of claim 1 wherein the video level of said modified position separation is at a video level in the region of blanking level.

9. The method of claim 1 including:

delaying the AGC pulse relative to the respective sync/pseudo sync pulse to provide a modified position separation that partially defeats the effects of the copy protection signals; and narrowing the AGC pulse an amount sufficient to defeat or substantially reduce the effects of the copy protection signals.

10. The method of claim 1 including:

advancing the trailing edge of the sync/pseudo sync pulses to provide a narrowed sync/pseudo sync signal;

delaying the leading edge of the respective AGC pulses to provide a narrowed AGC pulse; and wherein the resulting modified position separation between the sync/pseudo sync pulses and respective AGC pulses is sufficient to reduce the effects of the copy protection signals.

11. The method of claim 1 including:

delaying the position of the AGC pulse;

advancing the trailing edge of the sync/pseudo sync pulses to narrow the sync/pseudo sync pulse; and wherein the resulting modified position separation between the sync/pseudo sync pulses and the respective AGC pulses is sufficient to reduce the effects of the copy protection signals.

12. The method of claim 1 including:

removing all or sufficient portions of the copy protection signals of sync/pseudo sync and/or respective AGC pulses;

inserting new sync/pseudo sync pulses in advance of the position of the original sync/pseudo sync pulses that are removed; and/or inserting new AGC pulses in delayed relation to the position of the original AGC pulses;

thereby providing said modified position separation sufficient to reduce the effects of the copy protection signals.

13. The method of claim 1 including:

providing the small position separation between normal sync pulses and respective AGC pulses; and position modulating the AGC pulses while maintaining said modified position separation between the normal sync pulses and the respective AGC pulses which reduces the effects of the copy protection signals.

14. The method of claim 1 wherein the step of shifting includes:

reversing the order of at least portions of the sync/pseudo sync pulses and respective AGC pulses while maintaining said modified position separation.

15. The method of claim 1 wherein the step of shifting includes:

phase shifting at least portions of the sync/pseudo sync pulses aud the respective AGC pulses 180 degrees.

16. The method of claim 1 wherein the modified position separation caused by the shifted positions of the sync/pseudo sync pulses relative to the respective AGC pulses provides the reduction in the effects of the copy protection signals in the recorder or TV set which may include allowing a recording of a viewable copy of the video signal.

17. The method of claim 1 wherein the AGC pulses are raised back porch AGC pulses which are position modulated.

18. Apparatus for reducing the effects of copy protection signal in one or more selected video lines of a video signal being supplied to a recorder or television (TV) set, wherein the copy protection signals include sync and/or pseudo sync pulses together with respective automatic gain control (AGC) pulses, with the sync/pseudo sync pulses having a given small position separation, which can be zero separation, from the respective AGC pulses, comprising:

an input supplying the copy protected video signal with the trailing edge of the sync or pseudo sync pulses and the leading edge of the respective AGC pulses having the given small position separation which maintains the copy protection effect;

timing circuitry responsive to the input and providing timing signals coincident with one or more portions of the copy protection signals and indicative of one or more video lines containing sync/pseudo sync and respective AGC pulses; and a modifying circuit responsive to the timing circuitry and shifting a position of the sync/pseudo sync pulses or of the respective AGC pulses on said line so as to provide a modified position separation between the trailing edge of the sync or pseudo sync pulses and the leading edge of respective AGC pulses which is of sufficient position separation to reduce or defeat the effects of the copy protection signals.

19. The apparatus of claim 18 wherein:

the timing circuitry includes a sync separating circuit and provides selected sync signals; and a timing circuit responsive to the sync separating circuit and which provides the timing signals;

wherein the modifying circuit includes a delay circuit which delays one or more portion of the copy protected video signal; and wherein the apparatus further includes a switching circuit which inserts the delayed AGC pulses into the copy protected video signal in response to the timing signals.

20. The apparatus of claim 18 wherein:

the timing circuit includes a sync separating circuit which provide selected sync signals; and a timing circuit responsive to the sync separating circuit to provide the timing signals;

wherein the modifying circuit includes a logic circuit responsive to the timing circuit to provide a control signal indicative of the presence of the copy protection signals and of said modified position separation; and a switching circuit receiving the copy protected video signal for inserting the pulses having the modified position separation into the copy protected video signal in response to the control signal, to modify the widths of the sync/pseudo pulses and/or the respective AGC pulse.

21. The apparatus of claim 18 further comprising:

a chroma filter receiving the copy protected video signal and which inserts colon burst into the video signal.

22. The apparatus of claim 18 wherein the modified position separation provided by the modifying circuit causes the reduction in the effects of the copy protection signals in the recorder or TV set which may include allowing a recording of a viewable copy of the video signal.

23. Apparatus for reducing the effects of copy protection signals of a video signal being supplied to a recorder or television set, wherein the copy protection signals include sync/pseudo sync and respective automatic gain control (AGC) pulse pairs comprising:
- an input supplying the copy protected video signal with the sync/pseudo sync pulses and the respective AGC pulses;
- timing circuitry responsive to the input and providing timing signals coincident with one or more portions of the copy protection signals; and
- a modifying circuit for modifying the copy protected video signal, wherein the one or more portion of the modified copy protection signal is altered in reverse order in response to the timing signals to provide altered pulse pairs which defeat or reduce the effect of the copy protection signals.

24. The apparatus of claim 23 wherein the copy protected video signal reversing process is implemented for all or selected portions of all or a selected plurality of the sync/pseudo sync pulses and/or respective AGC pulses.

25. Apparatus for reducing the effects of copy protection signals of a video signal being supplied to a recorder or television set, wherein the copy protection signals include sync/pseudo sync and respective automatic gain control (AGC) pulse pairs, comprising:
- an input supplying the copy protected video signal having the sync/pseudo sync pulses and the respective AGC pulses which maintain the copy protection effect;
- timing circuitry responsive to the input and providing timing signals coincident with one or more portion of the copy protection signals;
- a modifying circuit including an inverting amplifier/phase shifter circuit receiving the copy protected video signal and responsive thereto to provide inverted/phase shifted sync/pseudo sync pulses and respective AGC pulses to modify one or more portion of the original sync/pseudo sync and respective AGC pulses.

26. The apparatus of claim 25 including:
- a second source of a second control voltage;
- level shifter/attenuator means receiving the output of the modifying circuit and responsive to the second control voltage for level shifting/attenuating the inverted/phase shifted sync/pseudo sync pulses and respective AGC pulses.

27. A method of synthesizing copy protection signals in a video signal, employing sync and/or pseudo sync pulses followed by respective automatic gain control (AGC) pulses, comprising:
- providing the sync or pseudo sync pulses with the tailing edges thereof generally coincident with the leading edges of respective AGC pulses thereby having essentially small to zero position separation consistent with maintaining copy protection;
- dynamically increasing over time the position separation between the sync/pseudo sync pulses and the respective AGC pulses so as to reduce or defeat the effects of the copy protection signals; and
- dynamically decreasing over time the position separation between the sync/pseudo sync pulses and the respective AGC pulses to return to the essentially small to zero position separation to maintain copy protection.

28. The method of claim 27 including:
dynamically varying the position separation between at least one sync/pseudo sync pulse and at least one respective AGC pulse from the essentially small to zero position separation to a position separation in the region of 1.5 to 5.0 microseconds.

29. The method of claim 27 including:
dynamically varying the position separation by dynamically varying the advancement of the trailing edge of the sync/pseudo sync pulses with respect to the respective AGC pulses.

30. The method of claim 27 including:
dynamically varying the position separation by dynamically varying the delay of the leading edge of the AGC pulses with respect to the respective sync/pseudo sync pulses.

31. The method of claim 27 including:
dynamically varying the position separation by dynamically varying the advancement of the sync/pseudo sync pulses while dynamically varying the delay of the respective AGC pulses.

32. The method of claim 27 including:
dynamically varying the position separation by dynamically varying the pulse width or the pulse width duration of the AGC pulses and/or of the sync/pseudo sync pulses.

33. The method of claim 27 including:
dynamically narrowing any portion or all of the AGC pulses and/or the sync/pseudo sync pulses.

34. The method of claim 33 wherein the pulse width of the sync/pseudo sync and/or AGC pulses are narrowed in the region of 100 percent to 50 percent.

35. The method of claim 27 wherein only the AGC pulses are shifted in position continuously or discretely.

36. The method of claim 27 further comprising:
dynamically amplitude modulating the sync pseudo sync and/or the AGC pulse.

37. The method of claim 27 further comprising:
narrowing any portion of the sync, pseudo sync and/or AGC pulses.

38. The method of claim 27 wherein the AGC pulses are shifted in position or are narrowed continuously or discretely to dynamically enable and disable the copy protection signals.

39. The method of claim 27 wherein the position separation or gap between the sync or pseudo sync pulse and the respective AGC pulse is gap width modulate.

40. The method of claim 27 wherein:
- the dynamic increasing and decreasing of the position separation comprises position and/or pulse width modulating the sync/pseudo sync and/or the AGC pulses; and
- amplitude modulating the position and/or pulse width modulated sync/pseudo sync and/or AGC pulses.

41. Apparatus for synthesizing copy protection signals in a video signal employing sync and/or pseudo sync pulses followed by respective automatic gain control (AGC) pulses, comprising:
- timing circuitry receiving the video signal and which provides timing signals indicative of video lines which are to contain the copy protection signals, and of the location in the video lines of selected copy protection signals;
- a generating circuit to generate selectively derived and modulated pseudo sync pulses, which are modulated in response to the timing circuitry, and which generate AGC pulses that vary in width and/or position in response to the respective selectively derived and modulated pseudo sync pulses; and
- a summing/inserting circuit receiving the video signal and responsive to the generating circuit and the timing circuitry to add or insert to the video signal a dynamic copy protection signal formed of the pseudo sync pulses and the respective width and/or position modulated AGC pulses.

42. The apparatus of claim 41 wherein:

the timing circuitry includes a sync separating circuit to provide a horizontal rate (H rate) signal;

a first circuit responsive to the H rate signal to provide a first signal which defines a positive pulse duration of an H rate related signal;

a timing generator responsive to the H rate signal and which provides a second signal indicative of the location of sync pulses in a video line;

a line circuit responsive to the H rate signal to provide a third signal indicative of the video lines which are to contain the copy protection signals; and a logic circuit responsive to the first, second and third signals to provide inverted pseudo sync pulses on selected video lines;

wherein the generating circuit includes a timer circuit responsive to control voltages to provide said AGC pulses that are varying in width and in position; and the summing/inserting circuit includes a summing amplifier receiving the video signal and responsive to said selectively derived pseudo sync pulses and said width and position varying AGC pulses, wherein the summing/inserting circuit provides the position modulated AGC pulses in combination with the derived pseudo sync pulses, resulting in a dynamically varying copy protected video signal.

43. The apparatus of claim 42 wherein:

said first circuit includes an H locked oscillator responsive to the H rate signal;

said line circuit includes a memory responsive to a line counter;

said timer circuit includes a pair of voltage controlled circuits; and said summing amplifier includes first and second summing amplifiers responsive to said derived pseudo sync pulses and said respective width and position delay varying AGC pulses.

44. The apparatus of claim 41 wherein:

the copy protection signals include sync, pseudo sync, AGC and/or raised bark porch AGC pulses; and said generating circuit provides dynamic position, pulse width and/or gap width modulation of the pulses.

45. Apparatus for synthesizing copy protection signals in a video signal employing sync and/or pseudo sync pulses followed by respective automatic gain control (AGC) pulses, comprising:

a generating circuit for providing the respective AGC pulses within at least a portion of a back porch; and wherein said generating circuit dynamically positions and/or width modulates the respective back porch AGC pulses to vary from maintaining to reducing copy protection effects or to vary from reducing to maintaining copy protection effects.

46. A method of providing copy protection signals in a video signal and for reducing the effects or effectiveness of the copy protection signals when desired, wherein the copy protection signals include sync and/or pseudo sync pulses and respective automatic gain control (AGC) pulses, comprising:

providing the sync/pseudo sync pulses with the trailing edges thereof coincident with, or separated by less than 1.0 microsecond from, the leading edges of respective AGC pulses to provide the copy protection signals; and position separating relative to time the sync/pseudo sync pulses relative to the respective AGC pulses sufficient to provide the reduction in the effects or effectiveness of the copy protection signals.

47. A method of reducing the effects or effectiveness of copy protection signals in one or more selected video lives of a video signal being supplied to a recorder or television (TV) set, wherein the copy protection signals include negative going pulses and respective positive going pulses, with the negative going pulses having a given small position separation, which may be zero separation, from the respective positive going pulses, comprising:

providing the negative going pulses with the trailing edge thereof having the small position separation from the leading edge of respective positive going pulses, wherein the small position separation maintains the copy protection effect; and shifting the relative position of either the trailing edge of the negative going pulses or the leading edge of the respective positive going pulses with respect to each other, or shifting the relative positions of the trailing edge of the negative going pulses and the leading edge of the respective positive going pulses, to provide a modified position separation between the trailing edge of the negative going pulses and the leading edge of the respective positive going pulses sufficient to reduce the effect of the copy protection signals.

48. Apparatus for reducing the effects or effectiveness of copy protection signals in one or more selected video lines of a video sisal being supplied to a recorder or television (TV) set, wherein the copy protection signals include negative going pulses and respective positive going pulses, with the negative going pulses having a given small position separation, which may be zero separation, from the respective positive going pulses, comprising:

input means supplying the copy protected video signal with the trailing edge of the negative going pulses and the leading edge of the respective positive going pulses having the given small position separation which maintains the copy protection effect;

timing circuitry responsive to the input means and providing timing signals coincident with one or more portions of the copy protection signals and indicative of one or more video lines containing the negative going pulse and the relative positive going pulses; and circuit means responsive to the timing circuitry and shifting the relative edges and/or positions of the negative going pulses and of the respective positive going pulses with respect to each other so as to provide a modified position separation between the trailing edge of the negative going pulses and the leading edge of the positive going pulses which is of sufficient position separation to reduce or defeat the effects of the copy protection signals.

49. A method of synthesizing copy protection signals in a video signal, employing sync and/or pseudo sync pulses followed by respective automatic gain control (AGC) pulses and/or raised back porch AGC pulses, comprising:

dynamically modulating at least one or a selected combination of a position, gap width, pulse width or amplitude of one or more of selected pulses of the sync, pseudo sync, AGC and/or raised back porch AGC pulses so as to synthesis the copy protection signals.

50. The method of claim 49 further including selected raised back porch pulses, wherein the selected raised back porch pulses are position modulated or position delayed to assist in said synthesis.

51. The method of claim 49 wherein only the AGC or raised back porch AGC pulses are position and/or pulse width modulated.

52. The method of claim 49 wherein only the sync and/or pseudo sync pulses are position and/or pulse width modulated.

53. A method of synthesizing copy protection signals in a video signal, employing sync, pseudo sync and respective automatic gain control (AGC) pulses, comprising:

dynamically modulating the position, pulse width and/or gap width of the AGC pulses or of the sync/pseudo sync pulses, wherein a single AGC and/or pseudo sync pulse is modulated to vary from maintaining to reducing copy protection effects or to vary from reducing to maintaining copy protection effects.

54. The method of claim 53 wherein the modulating includes amplitude modulation.

55. The method of claim 53 wherein any of a selected number and arrangement of AGC pulses are modulated to enable and disable the copy protection signal.

* * * * *

UNITED STATES PATENT AND TRADEMARK OFFICE
CERTIFICATE OF CORRECTION

PATENT NO. : 6,836,549 B1 Page 1 of 1
APPLICATION NO. : 09/388296
DATED : December 28, 2004
INVENTOR(S) : Quan et al.

It is certified that error appears in the above-identified patent and that said Letters Patent is hereby corrected as shown below:

In Column 15 at line 46 delete "bark" and insert --back--.

Signed and Sealed this

Twenty-ninth Day of August, 2006

JON W. DUDAS
*Director of the United States Patent and Trademark Office*